(12) United States Patent
Kawiecki

(10) Patent No.: US 11,372,427 B2
(45) Date of Patent: Jun. 28, 2022

(54) SYSTEM AND METHOD FOR ENHANCED ALTITUDE CONTROL OF AN AUTOGYRO

(71) Applicant: THE BOEING COMPANY, Chicago, IL (US)

(72) Inventor: Grzegorz Marian Kawiecki, Madrid (ES)

(73) Assignee: THE BOEING COMPANY, Chicago, IL (US)

(*) Notice: Subject to any disclaimer, the term of this patent is extended or adjusted under 35 U.S.C. 154(b) by 143 days.

(21) Appl. No.: 16/860,959

(22) Filed: Apr. 28, 2020

(65) Prior Publication Data

US 2020/0387170 A1  Dec. 10, 2020

(30) Foreign Application Priority Data

May 7, 2019 (EP) .................................... 19382343

(51) Int. Cl.
*B64C 27/02* (2006.01)
*G05D 1/04* (2006.01)
*G05D 1/10* (2006.01)

(52) U.S. Cl.
CPC ........... *G05D 1/042* (2013.01); *B64C 27/024* (2013.01); *B64C 27/025* (2013.01); *B64C 27/027* (2013.01); *G05D 1/105* (2013.01); *B64C 27/02* (2013.01)

(58) Field of Classification Search
CPC ........ B64C 27/02; B64C 27/027; G05D 1/042
See application file for complete search history.

(56) References Cited

U.S. PATENT DOCUMENTS

| 3,426,982 | A | * | 2/1969 | Markwood ......... B64C 29/0025 244/70 |
| 4,711,415 | A | | 12/1987 | Binden |
| 4,841,124 | A | | 6/1989 | Cox et al. |
| 5,269,657 | A | | 12/1993 | Garfinkle |
| 5,383,767 | A | | 1/1995 | Aubry |
| 5,544,844 | A | | 8/1996 | Groen et al. |
| 5,681,013 | A | | 10/1997 | Rudolph |
| 6,077,041 | A | | 6/2000 | Carter, Jr. |
| 6,196,800 | B1 | | 3/2001 | Bauer et al. |

(Continued)

FOREIGN PATENT DOCUMENTS

| CN | 1483634 A | 3/2004 |
| CN | 205168896 U | 4/2016 |

(Continued)

OTHER PUBLICATIONS

"A car that flies, a plane that drives", PAL-V, 2016, pp. 1-9.

(Continued)

*Primary Examiner* — Richard G Davis
(74) *Attorney, Agent, or Firm* — Moore Intellectual Property Law, PLLC

(57) ABSTRACT

A system for altitude control of an autogyro includes an unpowered rotor for generating lift and a forward propulsion system for generating a horizontal thrust component of a thrust vector for propelling the autogyro forward during flight. The system for altitude control also includes at least one thrust steering control devices configured to steer thrust generated by the forward propulsion system such that the forward propulsion system generates a vertical thrust component of the thrust vector.

20 Claims, 17 Drawing Sheets

(56) References Cited

U.S. PATENT DOCUMENTS

| | | | |
|---|---|---|---|
| 6,318,677 B1 | 11/2001 | Dixon | |
| 6,471,158 B1 | 10/2002 | Davis | |
| 8,821,128 B2 | 9/2014 | Bianchi et al. | |
| 2008/0317600 A1 | 12/2008 | Enevoldsen et al. | |
| 2009/0020652 A1 | 1/2009 | Rincker et al. | |
| 2010/0001120 A1* | 1/2010 | Sun | B64C 27/26 244/6 |
| 2012/0025011 A1 | 2/2012 | Hsueh | |
| 2015/0191255 A1 | 7/2015 | Zolich et al. | |
| 2016/0207617 A1 | 7/2016 | Sada-Salinas | |
| 2016/0221675 A1 | 8/2016 | Adam | |
| 2019/0077501 A1 | 3/2019 | Kawiecki | |

FOREIGN PATENT DOCUMENTS

| | | |
|---|---|---|
| DE | 10151954 A1 | 4/2003 |
| EP | 0459937 B1 | 12/1995 |
| EP | 2186728 B1 | 4/2012 |
| GB | 529243 A | 11/1940 |
| GB | 666491 A | 2/1952 |
| RU | 2027642 C1 | 1/1995 |
| RU | 2181332 C2 | 4/2002 |
| RU | 2228284 C2 | 5/2004 |
| RU | 2228285 C2 | 5/2004 |
| RU | 2659716 C1 | 7/2018 |
| RU | 2673933 C1 | 12/2018 |
| WO | 1982004426 A1 | 12/1982 |
| WO | 9708050 A1 | 3/1997 |
| WO | 2000061918 A3 | 1/2001 |
| WO | 2016118554 A1 | 7/2016 |

OTHER PUBLICATIONS

"Afzal Suleman", University of Victoria, Mechanical Engineering, 2015, 2 pages.
"Best Flying Cars concepts: Terrafugia Transition, Aeromobil, PAL-V -which one u prefer?", YouTube, 2016.
"CarterGyro Demonstrator Jump Takeoff Gyrocopter", YouTube, Published Apr. 5, 2007.
"Global Parcel Delivery Market Insight Report 2015—Combined Revenues of Carriers Covered in this Report Amounts to US$150 Billion," Research and Markets, Nov. 27, 2015, pp. 1-2.
"Letting fly", https://www.theengineer.co.uk/issues/16-january-2006/letting-fly Anonymous, The Engineer, Jan. 17, 2006, 5 pages.
"Lifting Personal Transportation Into the Third Dimension", mycopter—EU Project, © Max Planck Campus Tübingen 2017, 1 page.
"Maintenance Manual, Gyroplane Type Calidus (UK spec only)", RotorSport UK Ltd, Jan. 27, 2010, pp. 1-90.
"Research and Markets: The Global Unmanned Aerial Vehicle Market 2015-2025—Market Size and Drivers of the $115 Billion Industry", BusinessWire, 2015, pp. 1-2.
"The Business of Luxurious Cars: Must-Read Reports & Analysis", Reportlinker, 2016, 3 pages.
"The Transition", TERRAFUGIA, 2016, 4 pages.
"USB Pro Data Recorder", Eagle Tree Systems, 2013, 2 pages.
"Volocopter", https://www.volocopter.com/de/, 2016, 4 pages.
"What do you think? The roadable aircraft", Airwork, May 2, 2010, 5 pages.
Alden, A. et al., "Some Recent Developments in Wireless Power Transmission to Micro Air Vehicles," AIP Conference Proceedings, 2005, vol. 766, pp. 303-307.
Ali, "Pilotless Flying Cars versus Driverless Cars", All about Safety Engineering, Dec. 22, 2015, 5 pages.
Brown, W., "Microwave Energy Transmission," Third Princeton/AIAA Conference on Space Manufacturing Facilities, Princeton, N. J., May 9-12, 1977, pp. 1-8.
Eddy, "Google's Larry Page Investing Millions in Flying Cars", Informationweek, Jun. 9, 2016, 9 pages.
Hodges, D. H., "Torsion of Pretwisted Beams Due to Axial Loading," ASME Journal of Applied Mechanics, vol. 47, 1980, pp. 393-397.
Hubel, T. Y., "The importance of leading edge vortices under simplified flapping flight conditions at the size scale of birds," The Journal of Experimental Biology, vol. 213, 2010, pp. 1930-1939.
Johnson, Wayne "Helicopter Theory", Princeton University Press, 1980, pp. 1-961.
Lake, R. C. et al., "Experimental and Analytical Investigation of Dynamic Characteristics of Extension-Twist-Coupled Composite Tubular Spars," NASA TP 3225, ARL Technical Report 30, Feb. 1993, pp. 1-60.
Lentink, D., et al., "Leading-Edge Vortices Elevate Lift of Autorotating Plant Seeds," Science, vol. 324, Jun. 12, 2009, pp. 1438-1440.
Leniz, W. Karl, et al., "Optimum Coupling in Thin-Walled, Closed-Section Composite Beams", Journal of Aerospace Engineering, vol. 11, Jul. 1998, pp. 81-89.
Linn, "Flying car not as far-fetched a fantasy as you might think", Honolulu Advertiser, Aug. 29, 2004, pp. 1-2.
Majhi, et al., "Modeling Helicopter Rotor Blade Flapping Motion Considering Nonlinear Aerodynamics", Tech Science Press, CMES, vol. 27, No. 1, 2008, pp. 25-36.
Mega Motor http://www.megamotor.cz/v4/script/default.php? ☐ &SID=3038784308810fc1465c3397b23c4429&page_id=lang_eng, retrieved Sep. 12, 2017, 1 pg.
Nampy, S. N., et al., "Extension-Twist Coupled Tiltrotor Blades Using Flexible Matrix Composites," 46th AIAA/ASME/ASCE/AHS/ASC Structures, Structural Dynamics and Materials Conference, Apr. 18-21, 2005, pp. 1-19.
Nampy, S. N., et al., "Thermomechanical Behavior and Experimental Testing of Flexible Matrix Composite Box-Beams with Extension-Twist Coupling," 47th AIAA/ASME/ASCE/AHS/ASC Structures, Structural Dynamics, and Materials Conference, May 1-4, 2005, pp. 1-15.
Nangia, R. K. et al., 2007, "Leading-Edge Vortex Flaps on Moderate Sweep Wings-UCAV, Flow improvement at High Lift," AIM Paper 2007-267, 45th AIM Aerospace Sciences Meeting and Exhibit, Jan. 8-11, 2007, Reno, Nevada, pp. 1-17.
Nderjit Chopra, "Design and analysis trends of helicopter rotor systems", Sadhana, vol. 19, part 3, Jun. 1994, pp. 427-466.
Nixon, M., "Extension-Twist Coupling of Composite Circular Tubes with Application to Tilt Rotor Blade Design," AIAA Paper 87-0772, Structures, Structural Dynamics and Materials Conference, 28th, Monterey, CA, Apr. 6-8, 1987, pp. 295-303.
Oh, S.-Y. et al., "Thin-walled Rotating Composite Blades Featuring Extension-Twist Elastic Coupling," AIAA Paper 2004-2049, 45th AIAA/ASME/ASCE/AHS/ASC Structures, Structural Dynamics & Materials Conference, Apr. 19-22, 2004, Palm Springs, CA., pp. 1-13.
Ozbay, S., et al., "Optimum stacking sequences for extension-twist coupled composites subject to thermal stresses," Adv. Composite Mater, vol. 15, No. 2, pp. 127-137.
Prouty, R., "Helicopter Aerodynamics", Chapter 92—A New Look at the Autogyro, 2007, p. 495.
Shete, C. D., et al., "Optimal control of a pretwisted shearable smart composite rotating beam", Acta Mechanica, vol. 191, 2007, pp. 37-58.
Swanton, E. W. M., et al., "Leading Edge Vortex Stability in a Flapping Model Hummingbird Wing," AIM Paper 2008-3718, 38th Fluid Dynamics Conference and Exhibit, Jun. 23-26, 2008, Seattle, Washington, pp. 1-23.
Thomson, D. G. et al., "Application of Parameter Estimation to Improved Autogyro Simulation Model Fidelity," Journal of Aircraft, vol. 42, No. 1, Jan.-Feb. 2005, pp. 33-40.
Tielin, et al., "A Fast Method of Aerodynamic Computation for Compound Gyroplane", Aug. 15-16, 2015, pp. 91-96.
Warwick, "Airbus Reveals Urban Air-Transport Projects", Aviation Daily, Aug. 2, 2016, 4 pages.
Wheatley, et al., Analysis and Model Tests of AutoGiro Jump Take-Off, National Advisory Committee for Aeronautics, No. 582, Washington, Oct. 1936, pp. 1-31.
Wikipedia, "AutoGyro Calidus," https://en.wikipedia.org/wiki/AutoGyro_Calidus, retrieved Apr. 3, 2019, 3 pgs.
Leishman, J. G., 2006, "Principles of Helicopter Aerodynamics," Second Edition, Cambridge University Press, pp. 706-709.

(56) References Cited

OTHER PUBLICATIONS

Communication pursuant to Article 94(3) EPC dated Mar. 25, 2021 issued in corresponding EP Application No. 19382343, pp. 1-5.
Communication pursuant to Article 94(3) EPC dated Aug. 2, 2021 issued in corresponding EP Application No. 19382343, pp. 1-7.
Extended European Search Report dated Oct. 16, 2019 mailed in corresponding EP Application No. 19382343, 9 pgs.
"Autogyro/Gyrocopter," DLR Institute of Flight Systems, 2011, http://www.dlr.de/ft/en/desktopdefault.aspx/tabid-1396/1935_read-40093/, printed Mar. 30, 2020, 5 pgs.
"Flight Data Recorder," 2013, http://www.eagletreesystems.com/index.php?route=product/product&product_id=102&search=data+recorder&description=true, printed Mar. 30, 2020, 2 pgs.
"RC Autogyro Mega," 2012, http://www.megamotor.cz/v4/script/default.php?&sid=182ff18d5da24103ca7c4c790eb31a03&page_id=lang_eng, 1 pg.
Brindejonc A., 2005, "Design and testing of an autorotaative payload delivery system: the Autobody," Masters of Science Thesis, Dept. of Aerospace Engineering, The University of Maryland.
Leishman, J. G., 2006, "Principles of Helicopter Aerodynamics," Second Edition, Cambridge University Press.
McCrink M. H. and Gregory J. W., 2017, "Blade Element Momentum Modeling of Low-Reynolds Electric Propulsion Systems," Journal of Aircraft, vol. 54, No. 1, pp. 163-176, Jan.-Feb.
Newman, Daniel, 2017, "The Need for Flight Safety Assessment of Hybrid-Electric Propulsion Systems at the Conceptual-Level," AHS International Forum 73, Advanced Vertical Flight Technical Session, slide #4.

\* cited by examiner

| $v_D$ (m/s) | ω auto rotor (rpm) | thrust rotor (N) | thrust prop (N) | ω prop (rpm) |
|---|---|---|---|---|
| -1 | 189.7 | 0.502 | 7.543 | 5343 |
| -2 | 364.6 | 2.01 | 6.035 | 4936 |
| -3 | 567 | 4.54 | 3.505 | 3718 |
| -4 | 744.5 | 8.045 | 0 | 0 |

FIG. 10E

SYSTEM AND METHOD FOR ENHANCED ALTITUDE CONTROL OF AN AUTOGYRO

CROSS-REFERENCE TO RELATED APPLICATIONS

The present application claims priority from European Patent Application No. EP19382343, filed May 7, 2019, entitled "A SYSTEM AND METHOD FOR ENHANCED ALTITUDE CONTROL OF AN AUTOGYRO," which is incorporated by reference in its entirety.

FIELD OF THE DISCLOSURE

The present disclosure is comprised in the field of systems and methods for controlling altitude changes of an autogyro, which is particularly useful for landing operations.

BACKGROUND

Vertical Take-Off and Landing (VTOL) aircraft suffer from a significant takeoff/cruise power mismatch, which is larger than for Conventional Take-Off Landing (CTOL) aircraft. Simplicity, safety and low maintenance cost make autogyros an attractive disruptive mobility platform considering, in particular, that autogyros are able to land in vertical autorotation.

However, the air resistance offered by a typical rotor of an autogyro in vertical autorotation is comparable to that of a parachute with a similar radius, so that the descent velocity of the autogyro in that mode is quite high. For low forward speeds (i.e. close to 0 for vertical landing), the descent velocity of the autogyro rapidly increases, driving a magnitude of a resulting jolt at landing above a typical passenger comfort level.

The problem of high descent velocity and hard landing in vertical autorotation of autogyros is usually addressed by avoiding landings in vertical descent. Vertical descent velocities are much more reasonable for a range of forward flight velocities. Other solutions that allow vertical landings of autogyros involve implementing special shock-absorbing landing gear, which implies a considerable (and undesirable) weight penalty and an associated aerodynamic drag.

Therefore, there is a need for a system and method that address these problems. The present disclosure provides a method and system that allows enhanced control of the altitude of an autogyro during flight and solves the problem of excessive vertical descent velocity of the autogyro in landing operations.

SUMMARY

The present disclosure refers to a system and method for enhanced altitude control of an autogyro, and to an autogyro incorporating the system for enhanced altitude control. When applied to landing operations, instead of including special shock-absorbing landing gear in the autogyro the present disclosure makes use of the forward propulsion system of the autogyro to facilitate landing operations and reduce the vertical descent velocity of the autogyro. An autogyro using the system for enhanced altitude control of the present disclosure can significantly reduce the forward velocity while still maintaining a reduced vertical velocity, so that vertical landings can be smoothly performed by the autogyro.

In accordance with one aspect of the present disclosure, there is provided a system for enhanced altitude control of an autogyro of the type comprising an unpowered rotor for generating lift and a forward propulsion system for generating a horizontal thrust component for propelling the autogyro forward during flight. The system for enhanced altitude control comprises at least one thrust steering control device configured to steer the thrust generated by the forward propulsion system such that the forward propulsion system generates a vertical thrust component. In an embodiment, the system for enhanced altitude control is implemented as a system for enhanced landing of an autogyro, wherein the thrust steering control device is configured to steer the thrust vector of the forward propulsion system during landing operations, generating a vertical thrust component for reducing the vertical descent velocity of the autogyro during landing.

In accordance with a further aspect of the present disclosure, there is provided a method of enhanced altitude control of an autogyro of the type comprising an unpowered rotor for generating lift and a forward propulsion system for generating a horizontal thrust component for propelling the autogyro forward during flight. The method comprises steering the thrust generated by the forward propulsion system such that the forward propulsion system generates a vertical thrust component. In some implementations, the method of enhanced altitude control is implemented as a method of enhanced landing of an autogyro, wherein the thrust vector of the forward propulsion system is steered during landing operations to generate a vertical thrust component for reducing the vertical descent velocity of the autogyro during landing.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

A series of drawings which aid in better understanding the disclosure and which are expressly related with embodiments described in the disclosure as non-limiting examples thereof, are briefly described below.

FIG. 2A and FIG. 2B show, respectively, a lateral view and a front view of an autogyro with propulsion pods configured for forward flight. FIG. 2C and FIG. 2D, respectively, represent a side view and a front view of an autogyro with propulsion pods configured for smooth altitude control change, particularly useful for vertical descent flight. FIG. 2E shows an embodiment of thrust steering control devices adapted to rotate the propellers.

FIGS. 10A, 10B, 10C, 10D, and 10E illustrate exemplary results of numerical models used for computing thrust parameters during landing operations of an autogyro.

DETAILED DESCRIPTION

Figure 1:
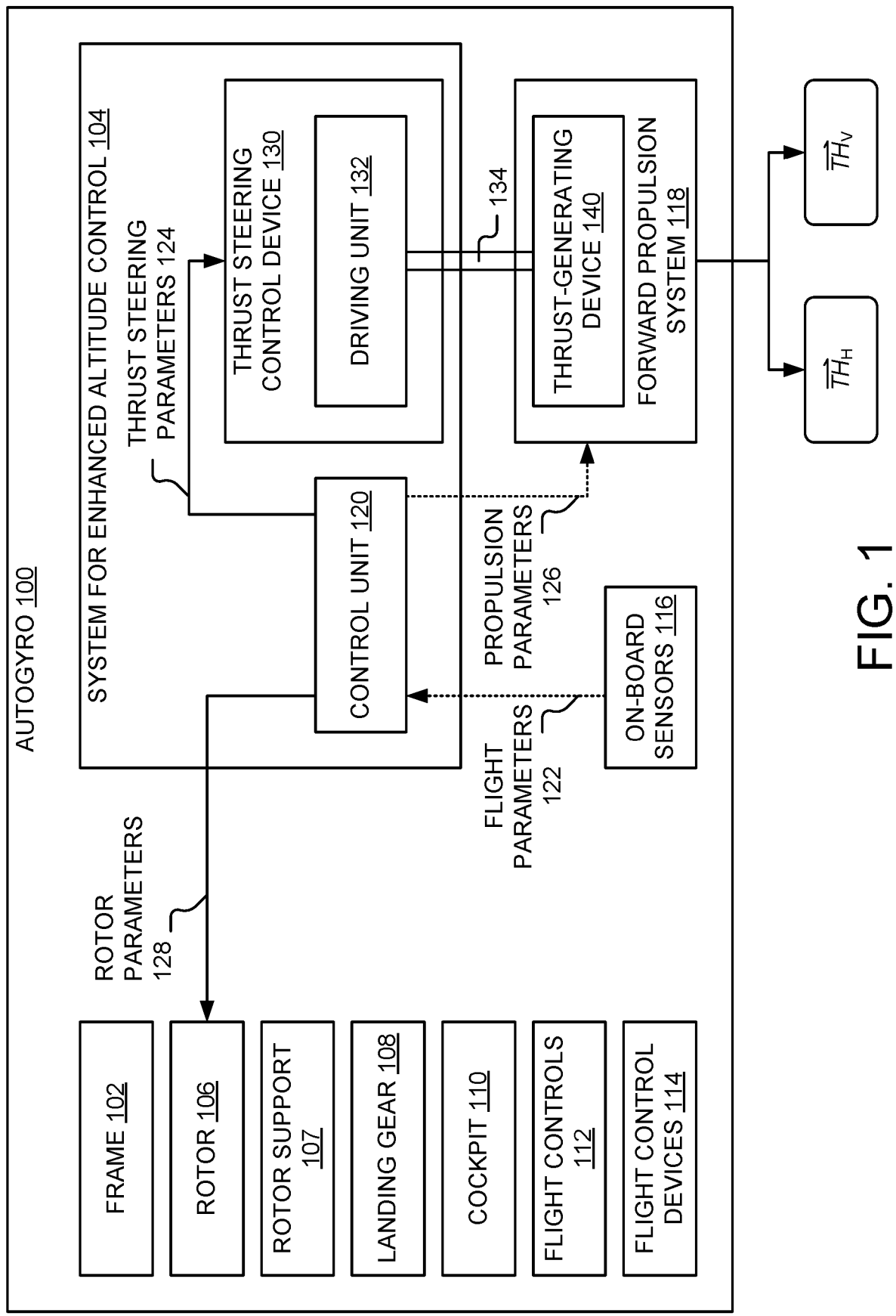
FIG. 1 depicts a block diagram of an autogyro including a system for enhanced altitude control according to the present disclosure.

Implementations described herein are directed to a system and method for enhancing altitude control changes of an autogyro vehicle during flight. FIG. 1 illustrates an example of an autogyro 100 including a system for enhanced altitude control 104 according to the present disclosure.

The autogyro includes a frame 102, a rotor (or rotors) 106 and a forward propulsion system 118. The frame 102 is configured to support components of the autogyro 100. The frame 102 may include or correspond to a fuselage or a body of the autogyro 100. The rotor 106 is coupled to the frame 102. The rotor 106 is configured to generate lift and is unpowered by onboard power sources (i.e., the rotor 106 freely rotates). For example, the rotor 106 generates lift through autorotation and incoming air moves upward through the rotor 106, rather than the rotor 106 being driven by an engine and forcing incoming air downwards (e.g., as in a helicopter).

The forward propulsion system 118 is configured to propel the autogyro 100 forward during flight by generating a horizontal thrust component ($\overline{TH}_H$) of a thrust vector ($\overline{TH}$). The forward propulsion system 118 comprises at least one thrust-generating device 140, such as one or more propulsion pods. For instance, the forward propulsion system 118 may include an engine and one or more propellers, the engine being configured to drive the propeller(s) to move the autogyro 100. The engine may include or correspond to an internal combustion engine, an electric engine, or a hybrid engine. The engine and the propeller(s) are arranged in a pusher configuration or a tractor configuration. The forward propulsion system 118 is configured to move (e.g., fly) the autogyro 100 while the autogyro 100 is in the air. Additionally, the forward propulsion system 118 may move (e.g., drive) the autogyro 100 while the autogyro 100 is on the ground. The relative motion of the autogyro 100 with respect to air generates airflow that turns the rotor 106 and provides lift. Incoming airflow generated by movement of the autogyro 100 drives (turns) the rotor 106, which is referred to as autorotation. The forward propulsion system 118 may include another type of propulsion technology different from an engine and propellers. For instance, the forward propulsion system 118 may be a jet-generating device (jet engine, ducted fan or similar) or an electro-aerodynamic (EAD) propulsion device (e.g., the autogyro is powered by "ionic wind").

The autogyro 100 further includes landing gear 108, flight controls 112, and flight control devices 114. The landing gear 108 is coupled to the frame 102 and may include or correspond to a set of wheels or skids. In some implementations, the landing gear 108 is retractable. In implementations where the landing gear 108 include a set of wheels, one or more wheels of the set of wheels may be controllable (e.g., steerable). For example, the one or more wheels may be turned to adjust a direction of the autogyro 100 when being driven on the ground.

The flight controls 112 are configured to move and direct the flight control devices 114. The flight control devices 114 are configured to adjust an attitude (e.g., pitch, roll, and yaw directions) of the autogyro 100 while the autogyro 100 is in the air. The flight control devices 114 may include autogyro flight control devices (such as rotor axis titling), aircraft flight control devices, helicopter flight control devices, or a combination thereof. The aircraft flight control devices may include one or more elevators, flaps, ailerons, a rudder, a tail, leading edge vortex flaps, or other flight control and flow control surfaces and devices. The helicopter flight control devices may include a swashplate or other helicopter flight control devices.

In a particular implementation, the flight controls 112 are remotely controllable. In such implementations, the autogyro 100 (e.g., an unmanned aerial vehicle (UAV)) includes a wireless transceiver configured to send data and receive control inputs. The data is collected by one or more sensors on-board the autogyro 100 (on-board sensors 116). In another particular implementation, the flight controls 112 are automated. For example, the autogyro 100 may be an autonomous aircraft and may include an autonomous controller configured to control the autogyro 100 from origin to destination based on data from the on-board sensors 116. In some implementations, only a portion of the trip from origin to destination is automated, such as a vertical take-off operation, a runway take-off operation, an air segment, a ground segment, a vertical landing operation, a runway landing operation, or a combination thereof.

In some implementations, the autogyro 100 includes a rotor support 107 and a cockpit 110. The rotor support 107 is coupled to the frame 102 and to the rotor 106. The rotor support 107 is configured to couple the rotor 106 to the frame 102 and to support loads generated by the rotor 106. In some implementations, the rotor support 107 is coupled to a shaft or mast of the rotor 106. The cockpit 110 is coupled to the frame 102 or corresponds to a portion of the frame 102. The cockpit 110 may include seating for one or more pilots, one or more passengers, or a combination thereof.

The system for enhanced altitude control 104 of the present disclosure comprises at least one thrust steering control device 130 configured to steer or change the direction of thrust (i.e., the direction of $\overline{TH}$) generated by the forward propulsion system 118 (for instance, during landing operations). To that end, when applied to landing operations the forward propulsion system 118 generates a vertical thrust component ($\overline{TH}_V$) for reducing the vertical descent velocity of the autogyro 100 during landing. The system and method may be applied in other type of operations, such as flight maneuvers for gaining or reducing altitude (e.g., to rapidly avoid an obstacle). Therefore, the vertical thrust component generated by the thrust steering control device may be used for increasing the vertical ascent velocity ($\overline{TH}_V$ positive, pointing upwards) or vertical descent velocity ($\overline{TH}_V$ negative, pointing downwards) of the autogyro, particularly useful when avoiding detected obstacles, or for reducing the vertical descent velocity. Reducing the vertical descent velocity is especially relevant during landing.

The at least one thrust steering control device 130 comprises a driving unit 132 coupled to at least one thrust-generating device 140 for enabling the generation of the $\overline{TH}_V$. The driving unit 132 is coupled mechanically, electrically, electronically, or combinations thereof, by a connection 134 to the at least one thrust-generating device 140.

The system for enhanced altitude control 104 may comprise a control unit 120 configured to activate (e.g., during landing operations) at least one thrust steering control device 130 to generate the $\overline{TH}_V$ of $\overline{TH}$ caused by the forward propulsion system 118. The control unit 120 activates the at least one thrust steering control device 130 by setting one or more thrust steering parameters 124 of the thrust steering control device 130.

In some implementations, the control unit 120 receives flight parameters 122 acquired by the on-board sensors 116 and computes the thrust steering parameters 124 based on the received flight parameters 122. Alternatively, or in addition, the control unit 120 may use the flight parameters 122 to compute propulsion parameters 126 to adjust the thrust generated by the forward propulsion system 118, rotor parameters 128 to adjust the thrust generated by the rotor 106, or both. For example, the control unit 120 adjusts the thrust generated by the rotor 106 by adjusting a pitch angle of a rotor hub to increase or decrease an angle of attack of rotor blades of the rotor 106).

Figure 2A:
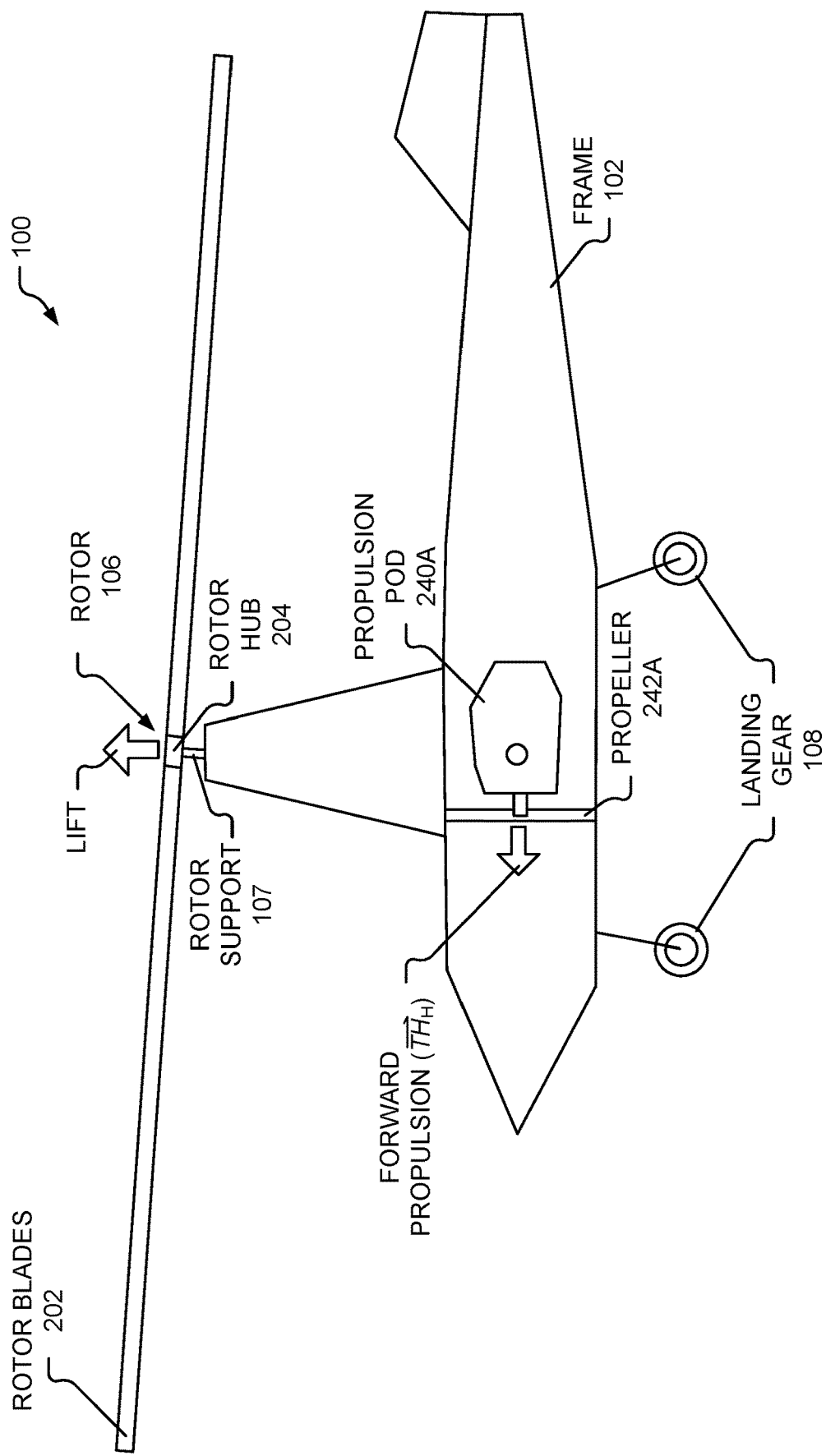
FIGS. 2A-2E illustrate an embodiment of the system for enhanced altitude control applied to an autogyro powered by twin propellers.
Figure 2B:
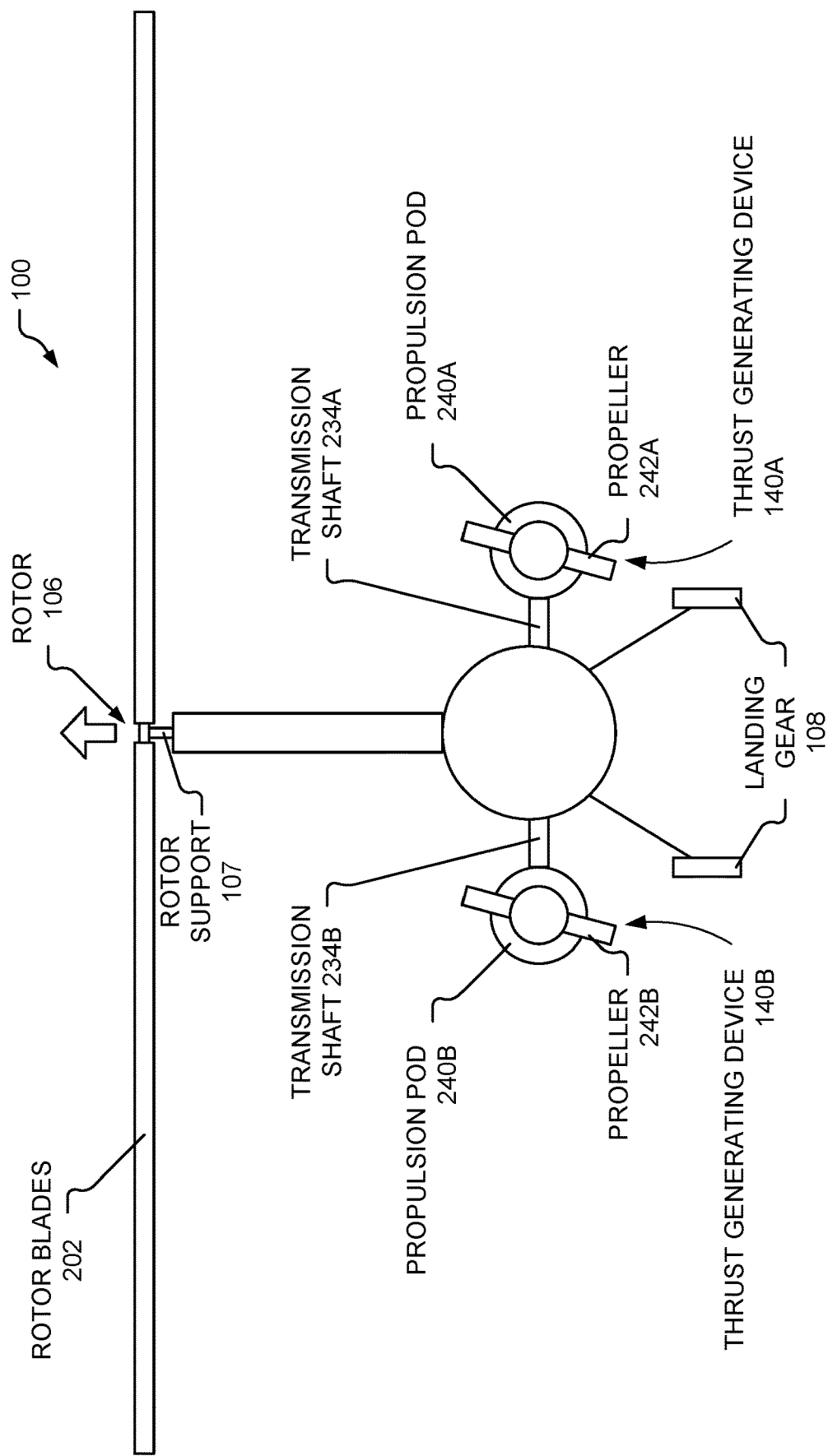

An embodiment of the system for enhanced altitude control 104 applied to an autogyro 100 is depicted in FIGS. 2A-2E. FIG. 3 depicts a block diagram of the autogyro 100 of FIGS. 2A through 2E, including the system for enhanced altitude control 104. The rotor 106 of the autogyro 100 includes a rotor hub 204 and a plurality of rotor blades 202. In this example, the forward propulsion system 118 comprises an engine 250 and two thrust-generating devices 140a, 140b, as depicted in FIG. 3, implemented as a pair of propulsion pods 240A, 240B, each comprising a propeller 242A, 242B facing forward for propelling the autogyro 100 forward during flight, as depicted in FIG. 2A (i.e., a side view of the autogyro) and FIG. 2B (i.e., a front view of the autogyro).

In this embodiment, the system for enhanced altitude control 104 comprises two thrust steering control devices 230A, 230B. Each thrust steering control device 230A, 230B comprises a transmission shaft 234A, 234B, coupled to a respective propulsion pod 240A, 240B, and a motor 232A, 232B for rotating the transmission shaft 234A, 234B such that the propeller 242A, 242B of the respective propulsion pod 240A, 240B faces at least partially upward for generating a vertical thrust component (e.g., $(\overline{TH}_V)_A$, $(\overline{TH}_V)_B$). As depicted in FIG. 2B and FIG. 2D, one propulsion pod is coupled to either side of the autogyro 100 through respective transmission shafts 234A, 234B. In some implementations the thrust steering control devices 230A, 230B may share a single motor, instead of having one motor each. This solution involves only a minimal increase of complexity and weight, while providing the already explained advantages during landing operations.

Figure 2C:
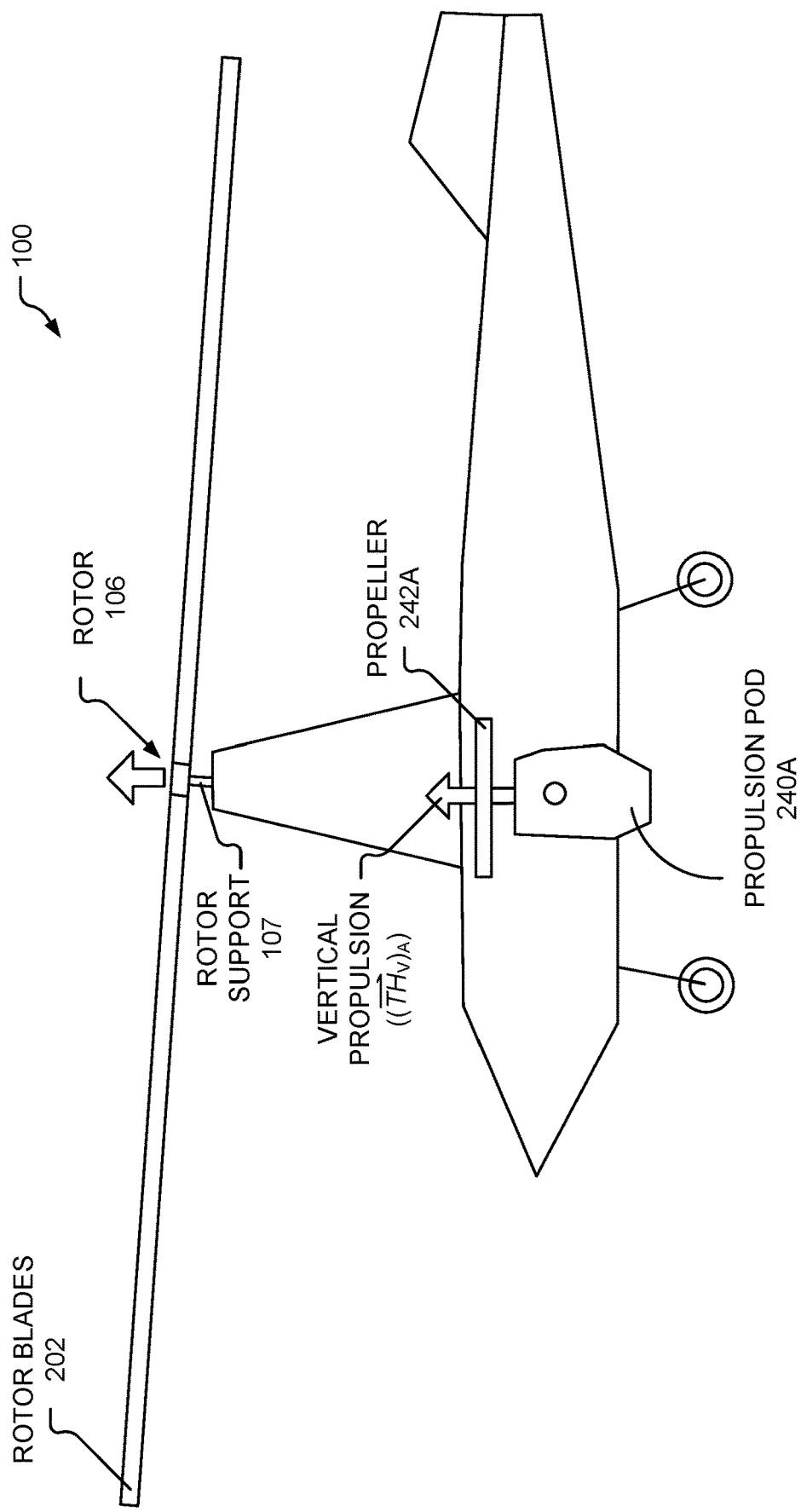
Figure 2D:
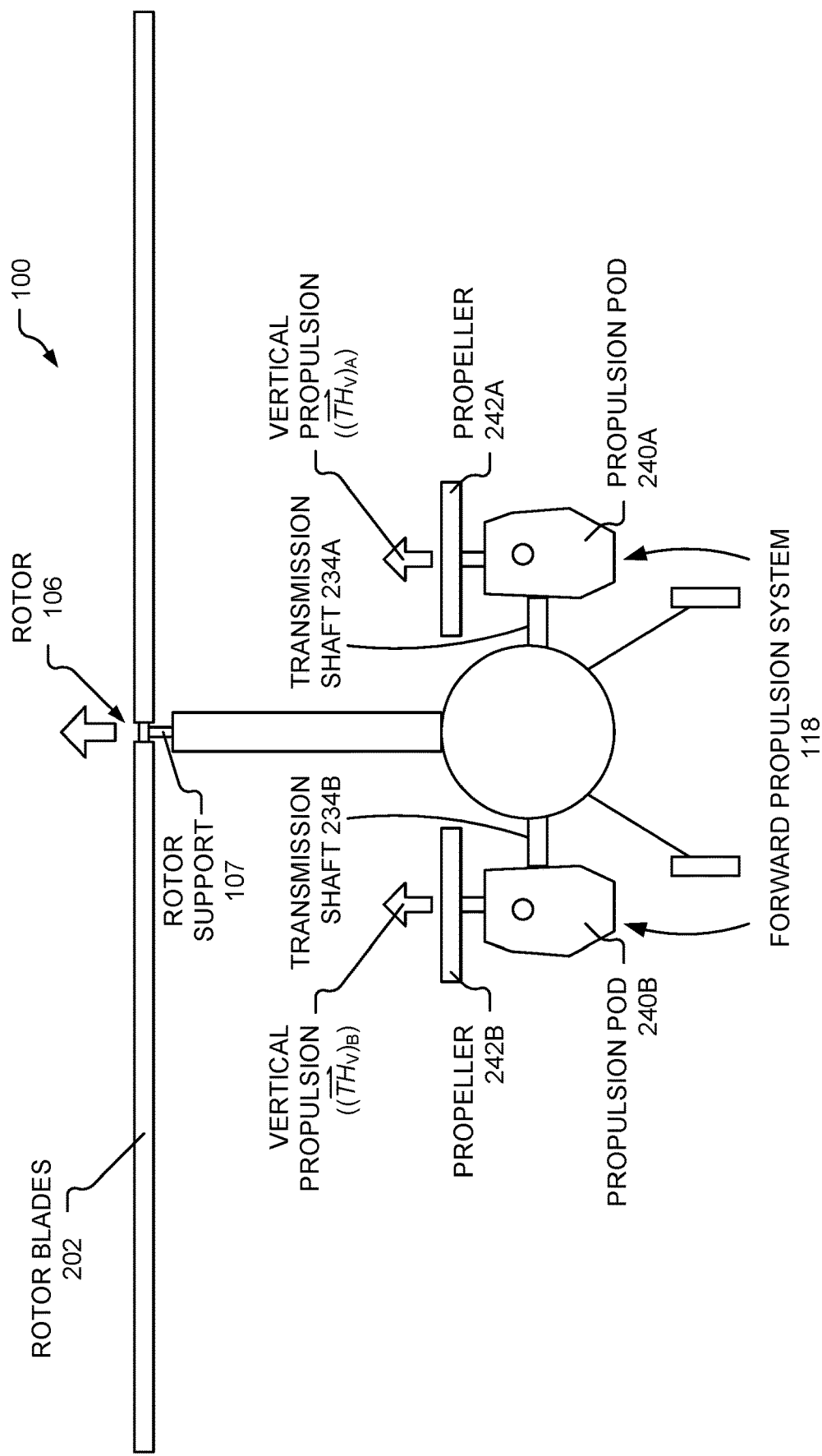
Figure 2E:
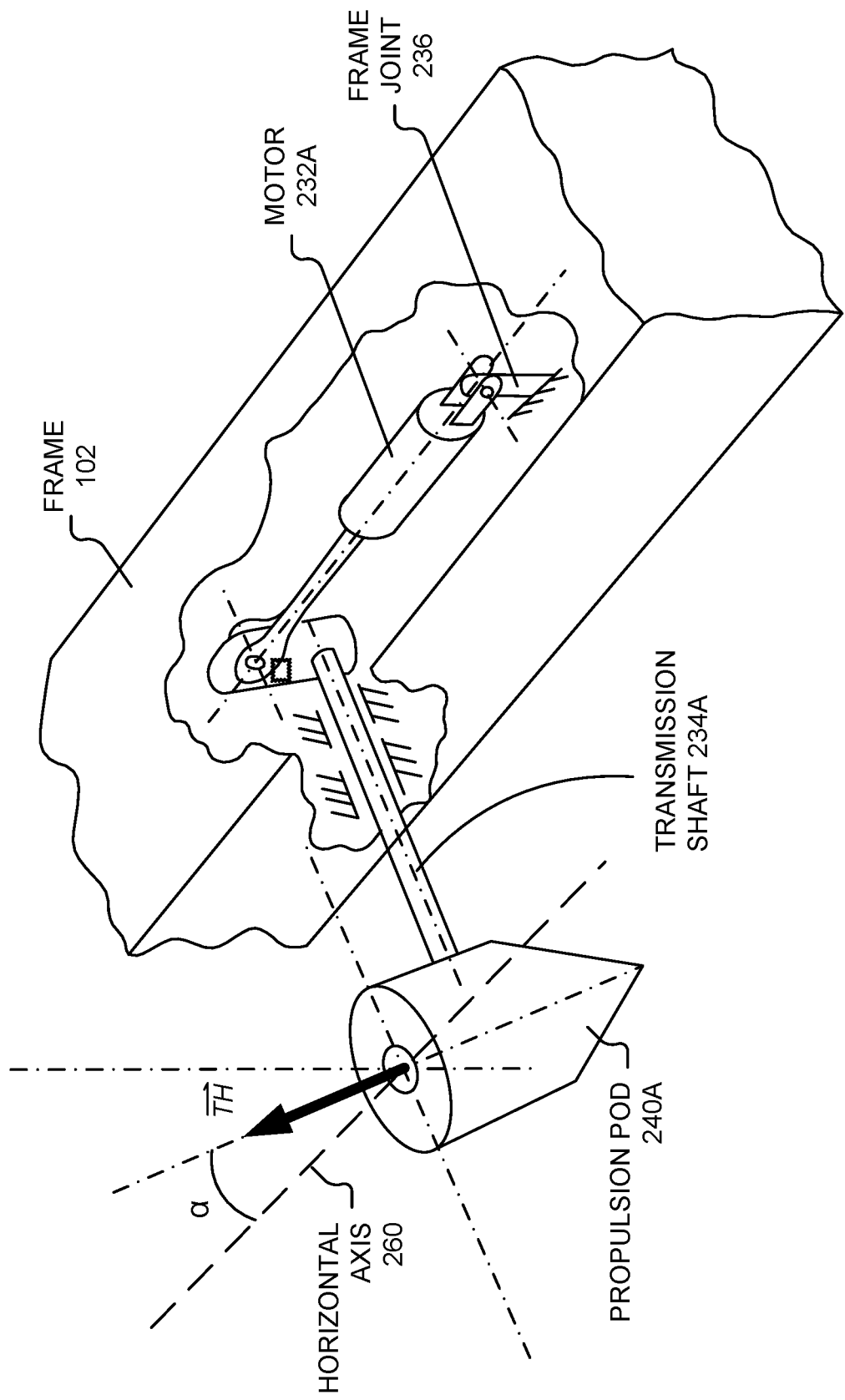
Figure 3:
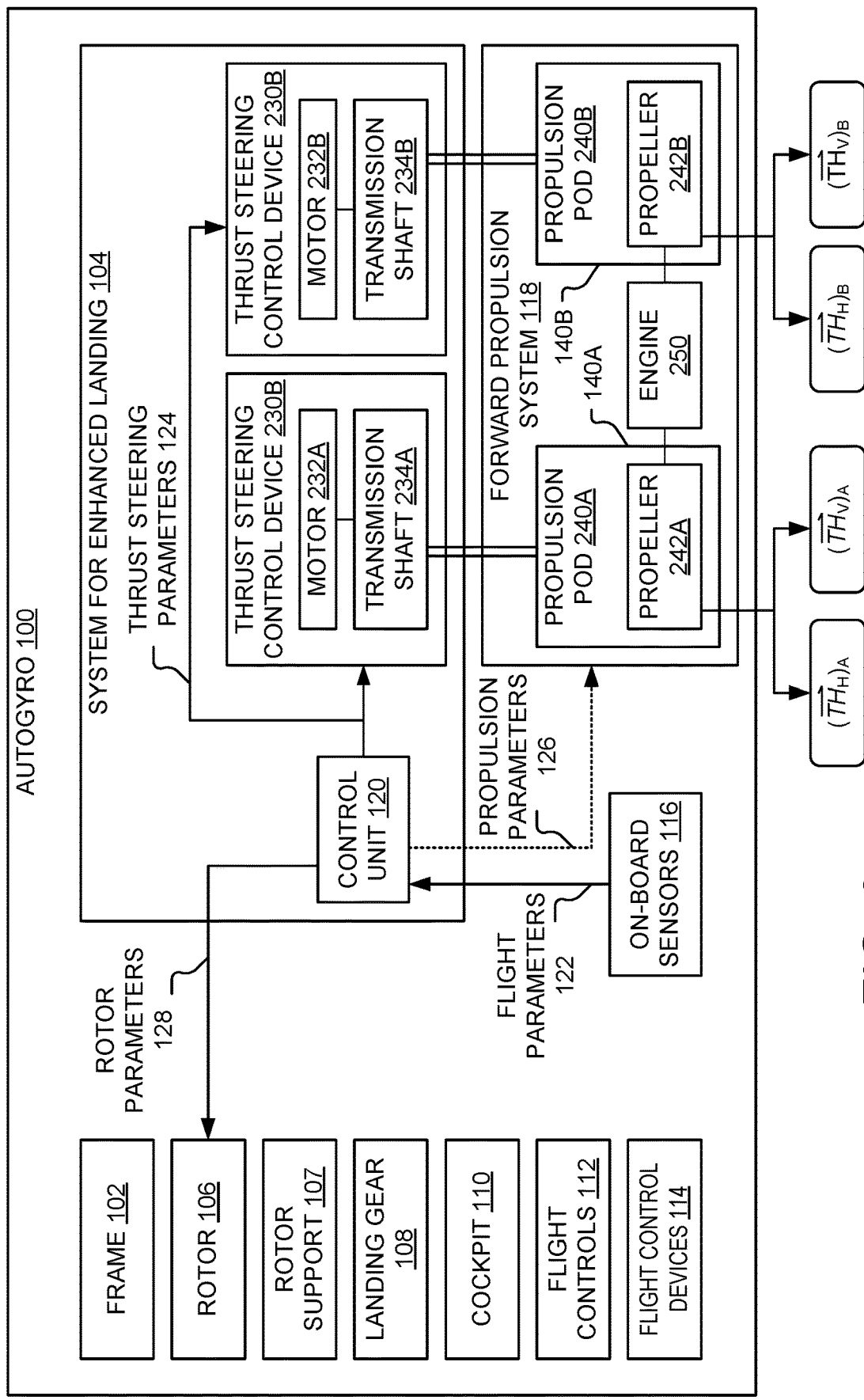
FIG. 3 is a block diagram of the autogyro of FIGS. 2A-2E.

In the embodiment shown in FIG. 2C and FIG. 2D, the thrust steering control devices 230A, 230B are configured to rotate 90 degrees with respect to a horizontal axis (e.g., where an angle α depicted in FIG. 2E is 90 degrees with respect to horizontal axis 260) so that the direction of thrust is able to sweep the propulsion pods 240A, 240B 90 degrees from a horizontal direction to a vertical direction. When the propulsion pods 240A, 240B are fully facing upwards, the ($\overline{TH}_V)_A$, $(\overline{TH}_V)_B$ generated by respective propellers 242A, 242B are maximized. Alternatively, the thrust steering control devices 230A, 230B may be configured to rotate a tilting degree different than 90 degrees (i.e., partially upward) to generate a horizontal thrust component along with a vertical thrust component, which allows modifying the forward speed of the autogyro and, therefore, the lift generated by the rotor 106 working in autorotation.

Since the control unit 120 can individually control each thrust steering control device 230A, 230B, different tilting degrees a or angles of inclination (e.g., a first tilting degree of 85 degrees for a first propulsion pod 240A and a second tilting degree of 95 degrees for the second propulsion pod 240B) may be selected for the propulsion pods 240A, 240B, as shown for instance in the partial sectional view of FIG. 2E, which depicts one of the two thrust steering vector control devices. In particular, FIG. 2E shows that first propulsion pod 240A generates thrust vector ($\overline{TH}$) tilted at the angle (α) with respect to a horizontal axis 260, and an actuator or driving unit (e.g., a motor 232A) mechanically coupled to transmission shaft 234A to produce rotation thereof. The frame of the driving unit is attached to the frame 102 of the autogyro 100 through a corresponding frame joint 236. Different inclinations of the propulsion pods 240A, 240B can be used, for instance, to generate torque that assists in a landing operation of the autogyro 100.

Figure 4:
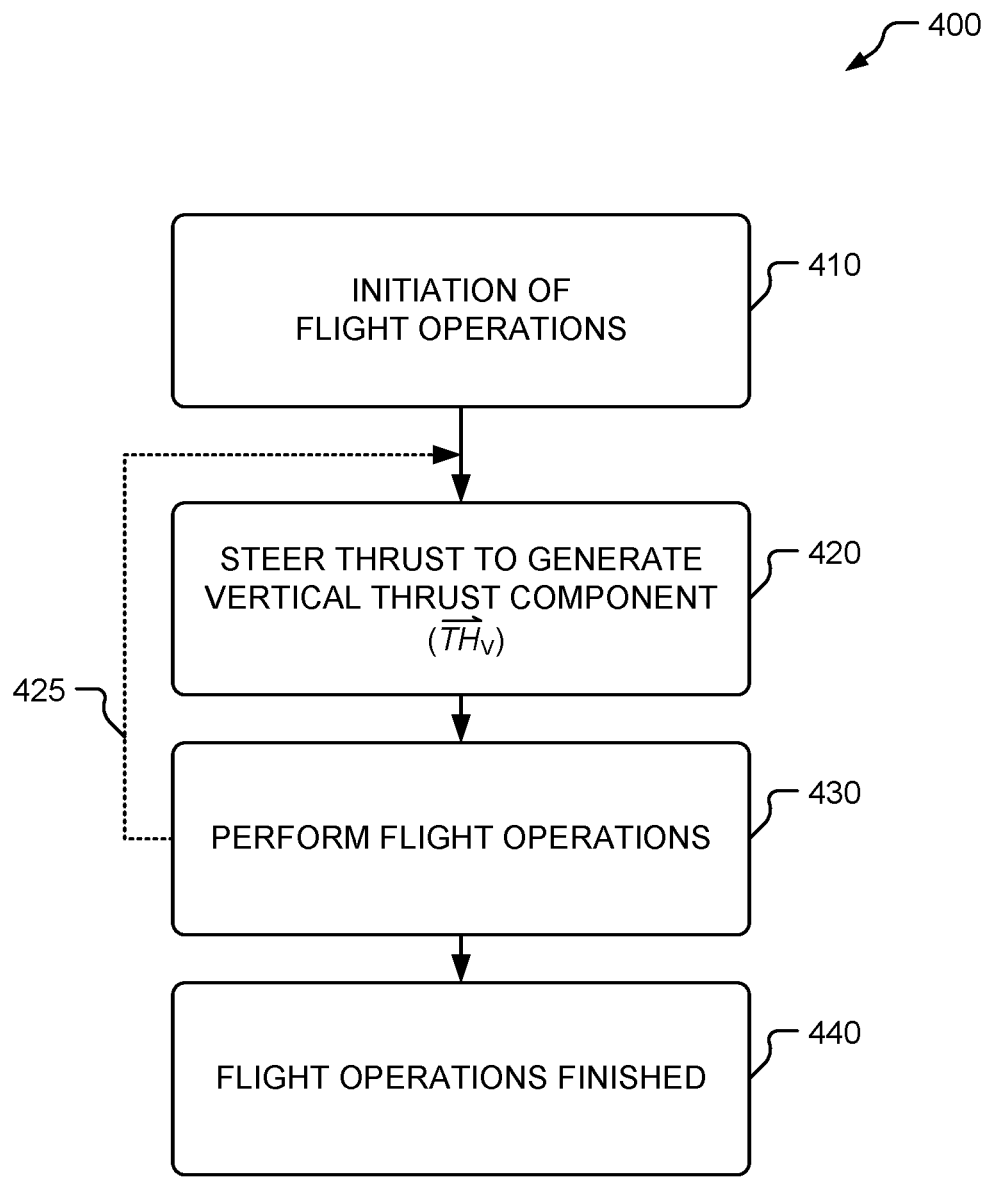
FIG. 4 is a flow diagram of a method of enhanced altitude control of an autogyro.

FIG. 4 is a flow diagram of a method of enhanced altitude control 400 of an autogyro 100 of the type comprising an unpowered rotor 106 for generating lift and a forward propulsion system 118 for generating a $\overline{TH}_H$ for propelling the autogyro 100 forward during flight. The method comprises, once flight operations have been initiated 410 (e.g., landing operations), steering the thrust 420 (e.g., changing the direction of the resulting thrust vector) generated by the forward propulsion system 118 during flight operations 430 such that the forward propulsion system 118 generates a $\overline{TH}_V$, used for instance to reduce the vertical descent velocity of the autogyro 100 during the landing operations.

In an embodiment, the change in the direction of thrust to generate the $\overline{TH}_V$ may be performed once, just after initiation of flight operations 410. For instance, the propulsion pods 240A, 240B are rotated 90 degrees when initiating flight operations 410, as depicted in FIG. 2D, and the propulsion pods 240A, 240B remain with said tilting degree until the flight operations are finished 440.

In some embodiments, the direction of thrust may be changed more than once when performing the flight operations 430. The dotted line 425 in FIG. 4 represents the optional step(s). For instance, in the example of FIGS. 2A-2D the propulsion pods 240A, 240B may be initially rotated at a certain degree (e.g., 45 degrees, 60 degrees, or 90 degrees), and then the tilting degree of the propulsion pods 240A, 240B may be continuously adjusted (e.g., based on flight parameters measured by the on-board sensors 116, such as wind velocity and/or direction, vertical descent velocity of the autogyro, etc.).

Figure 5:
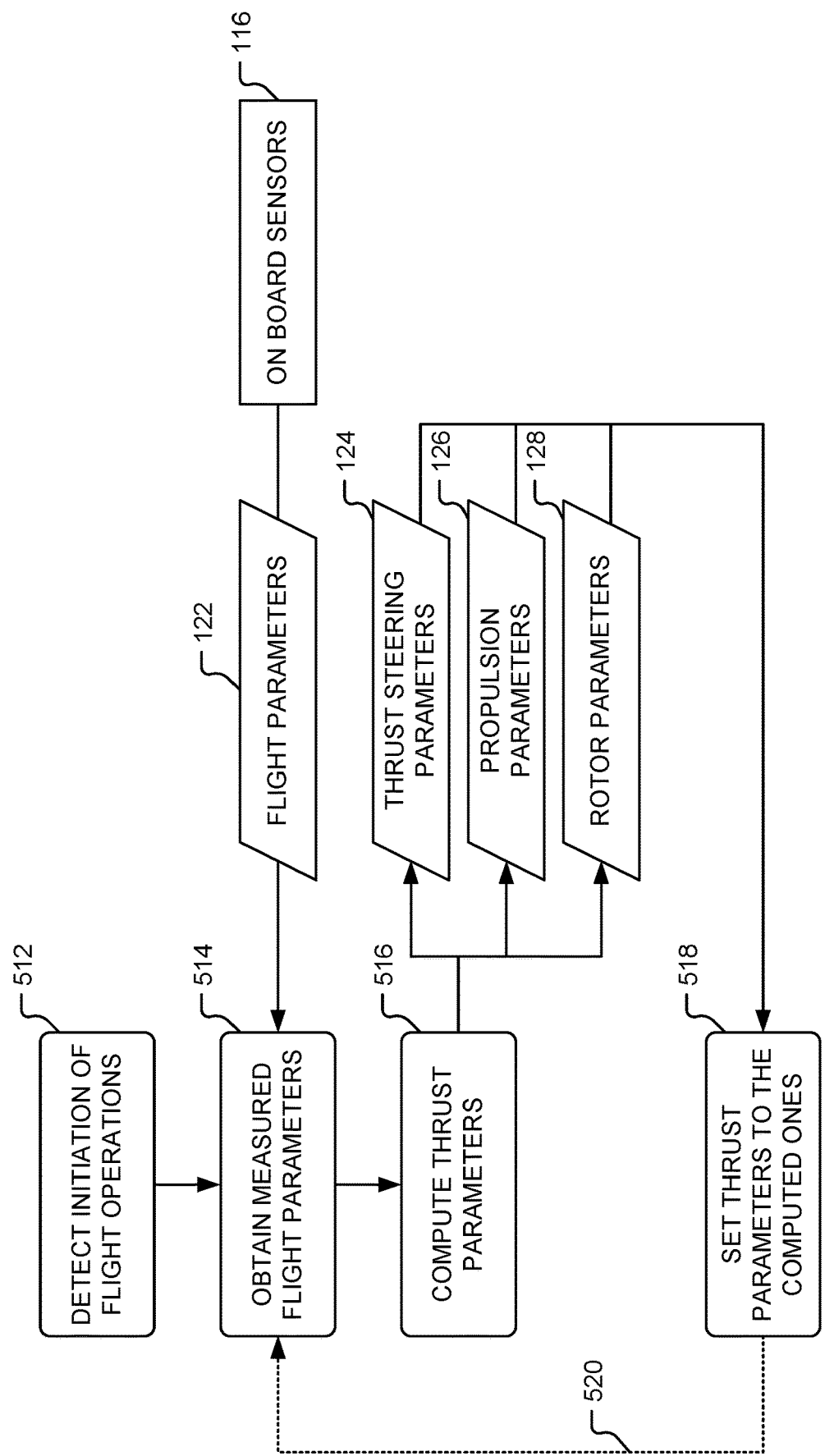
FIG. 5 depicts additional and optional steps of the method of enhanced altitude control of FIG. 4.

In some embodiments, the method of enhanced altitude control 400 further comprises the steps of FIG. 5. These steps may be executed by the control unit 120. Initiation of flight operations 410 (e.g., landing operations) of the autogyro is first detected 512. One or more flight parameters 122 measured by on-board sensors 116 of the autogyro 100 are obtained 514 by the control unit 120. The measured flight parameters 122 may comprise, for example, vertical descent velocity of the autogyro 100, angular speed of the rotor 106, fuselage pitch and/or roll angles (measured for instance using a calibrated accelerometer), inclination of rotor hub, angular speed of the propellers (242A, 242B) of the forward propulsion system 118, motor current and/or voltage, lateral velocity of the autogyro 100, autogyro speed (e.g., GPS speed), altitude, GPS position and/or trajectory of the autogyro, wind velocity and/or direction, turbulence level, or a combination thereof.

The control unit 120 computes 516, using the measured flight parameters 122, one or more thrust parameters. The thrust parameters are parameters that contribute to the direction and/or magnitude of the thrust vector generated by the forward propulsion system 118. The thrust parameters may include thrust steering parameters 124 of the thrust steering control device 130, and/or propulsion parameters 126 of the forward propulsion system 118, and/or rotor parameters 128 of the rotor 106. For instance, in the example of FIG. 2A-2E the thrust steering parameters 124 include the tilting degree of the propulsion pods 240A, 240B, whereas the propulsion parameters 126 may include the angular speed and/or the pitch of the propellers 242A, 242B of the forward propulsion system 118.

The control unit sets 518 the one or more thrust parameters to the one or more computed thrust parameters. For instance, the control unit 120 commands a determined angular speed of the propellers 242A, 242B or a certain tilting degree of the propulsion pods 240A, 240B. As shown with a dotted line 520, the steps 514, 516, 518 may be repeatedly performed during the flight operations 430 (e.g., landing operations); therefore, the thrust parameters may change during flight operations.

Figure 6:
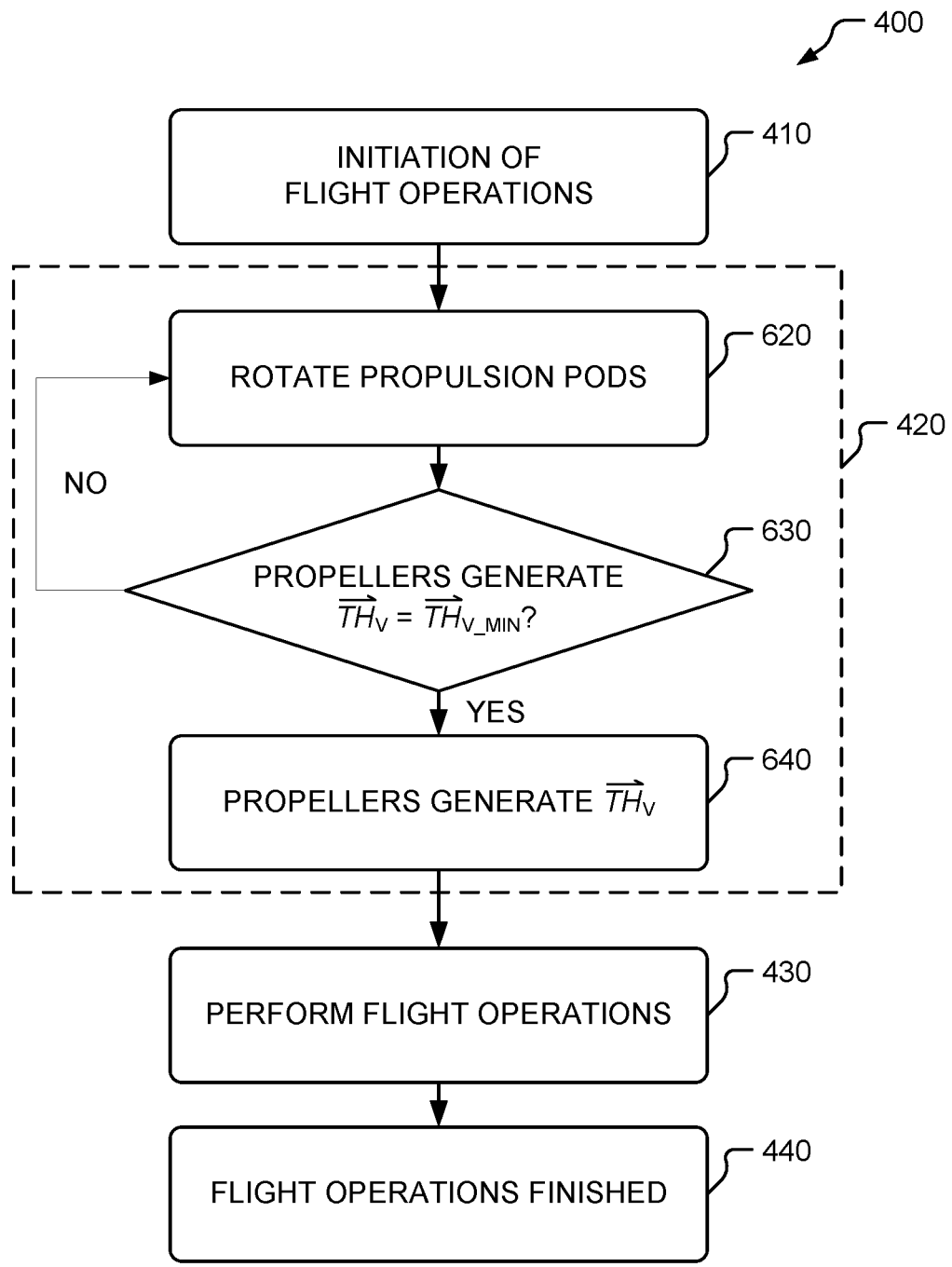
FIG. 6 shows the steps of a method of enhanced altitude control applied to an autogyro driven by propellers.

In the embodiment shown in FIG. 6, the method of enhanced altitude control 400 is applied to an autogyro 100 with a forward propulsion system 118 of the type comprising one or more propulsion pods 240A, 240B, each propulsion pod 240A, 240B comprising a propeller 242A, 242B facing forward for propelling the autogyro 100 forward during flight. In this embodiment, the step of steering the thrust 420 comprises rotating 620 the one or more propulsion pods 240A, 240B during flight operations such that each propeller 242A, 242B faces at least partially upward for generating ($\overline{TH}_V)_A$, ($\overline{TH}_V)_B$. In order to rotate the propulsion pods 240A, 240B, the control unit 120 activates the corresponding driving units 132 (i.e., the motors 232A, 232B) to rotate the transmission shafts 234A, 234B coupled to each propulsion pod 240A, 240B. In 630, it is checked whether the propellers generate sufficient vertical thrust components ($\overline{TH}_V)_A$, ($\overline{TH}_V)_B$; for instance, a check is performed to determine if a generated $\overline{TH}_V$ reaches or exceeds a determined threshold (e.g., a minimum required vertical thrust component $\overline{TH}_{V\_MIN}$). Alternatively, or in addition, the thrust steering control devices 230A, 230B may monitor the tilting degree of the propulsion pods 240A, 240B, using sensors for measuring angular position such as a shaft encoder, to check whether the propellers are rotated the target tilting degree (e.g., 90 degrees, such that the propellers 242A, 242B are facing upwards). When the condition monitored in 630 is fulfilled, in 640, the propellers are in position and generate the required vertical thrust component $\overline{TH}_V$.

Figure 7:
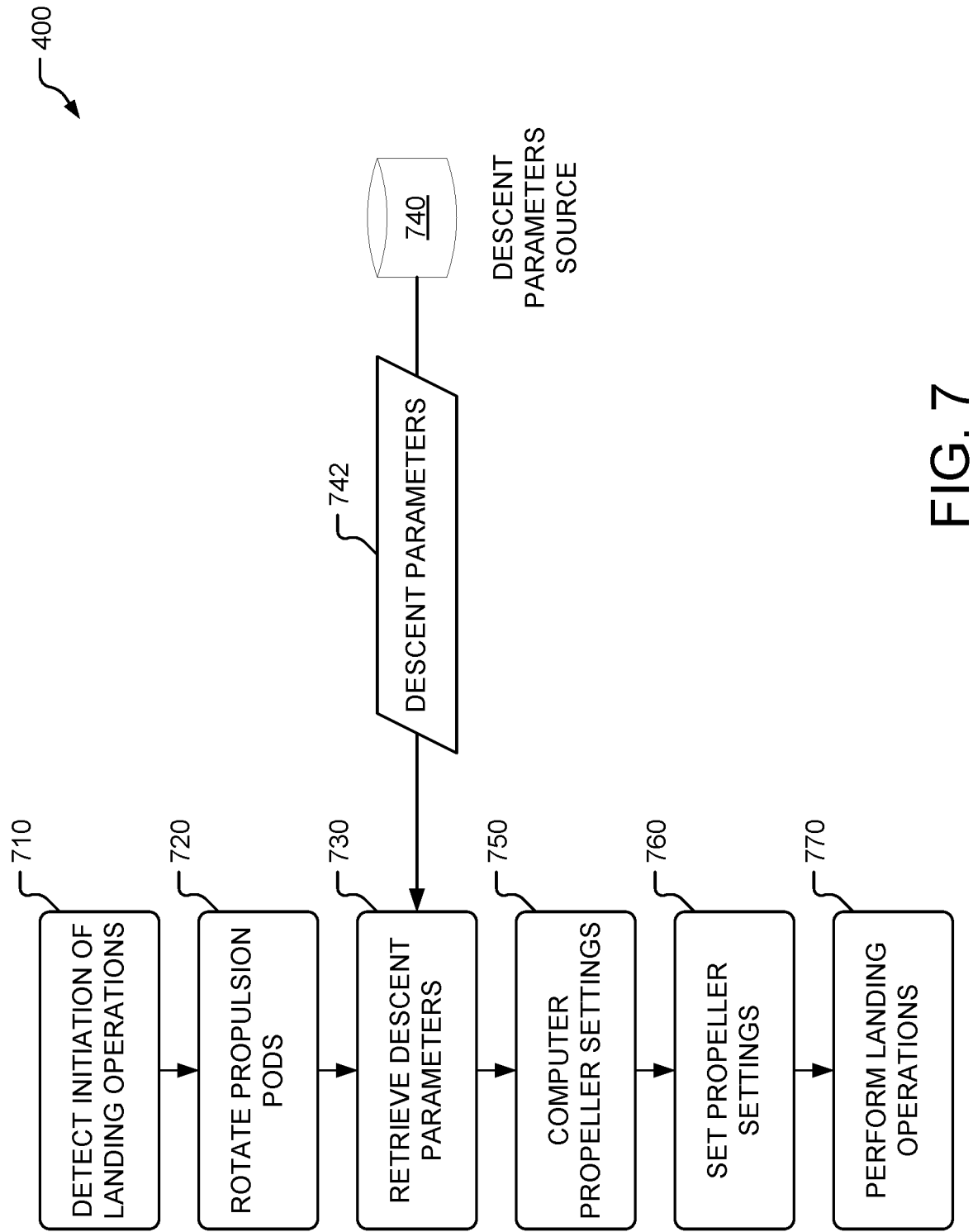
FIG. 7 depicts another example of a method of enhanced altitude control.
Figure 8:
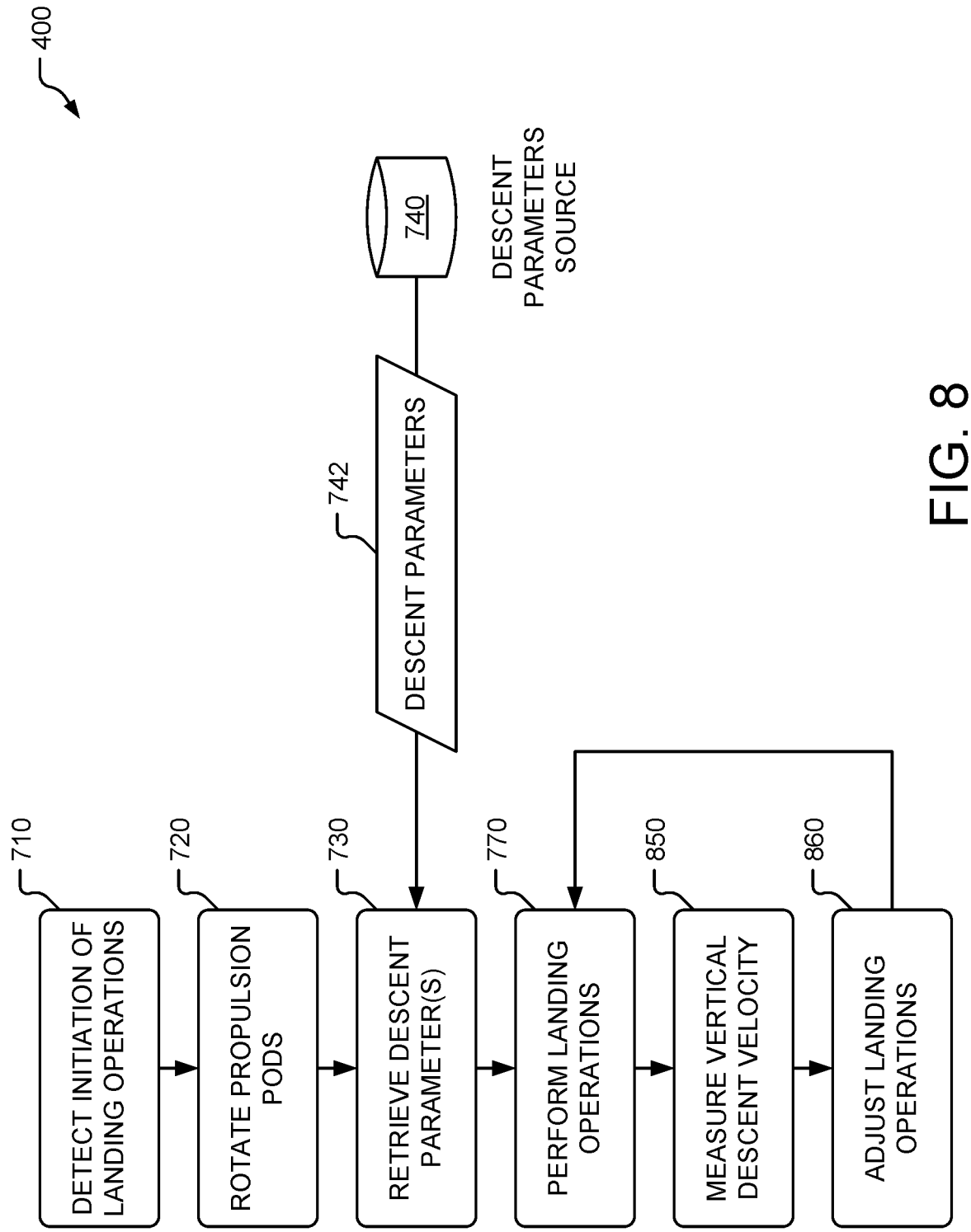
FIG. 8 depicts a further example of a method of enhanced altitude control.

FIG. 7 and FIG. 8 depict further examples of a method of enhanced altitude control 400 applied to landing operations of an autogyro 100 with a forward propulsion system 118 based on propulsion pods and propellers. In these embodiments, the control unit 120 is configured to detect initiation of landing operations 710, rotate propulsion pods 720, and compute or adjust the thrust parameters considering one or more descent parameters 742. The descent parameters 742 include at least a target vertical descent velocity of the autogyro 100 during landing. The descent parameters 742 are retrieved 730 by the control unit 120 from a descent parameters source 740. In the example of FIG. 7, the control unit computes 750 the settings of each propeller, such as rotational velocity, pitch, or both, and sets 760 the propeller settings to the computed ones. Landing operations are then performed 770. In the embodiment of FIG. 8, while performing landing operations 770, the vertical descent velocity of the autogyro is repeatedly measured 850 and the settings of the propellers (e.g., rotational velocity, blade pitch, or both) are repeatedly adjusted 860 to try to maintain the vertical descent velocity of the autogyro close or equal to the target vertical descent velocity (for instance, −1 m/s). To that end, the control unit 120 may use a proportional-integral-derivative controller or another control loop feedback mechanism.

Figure 9:
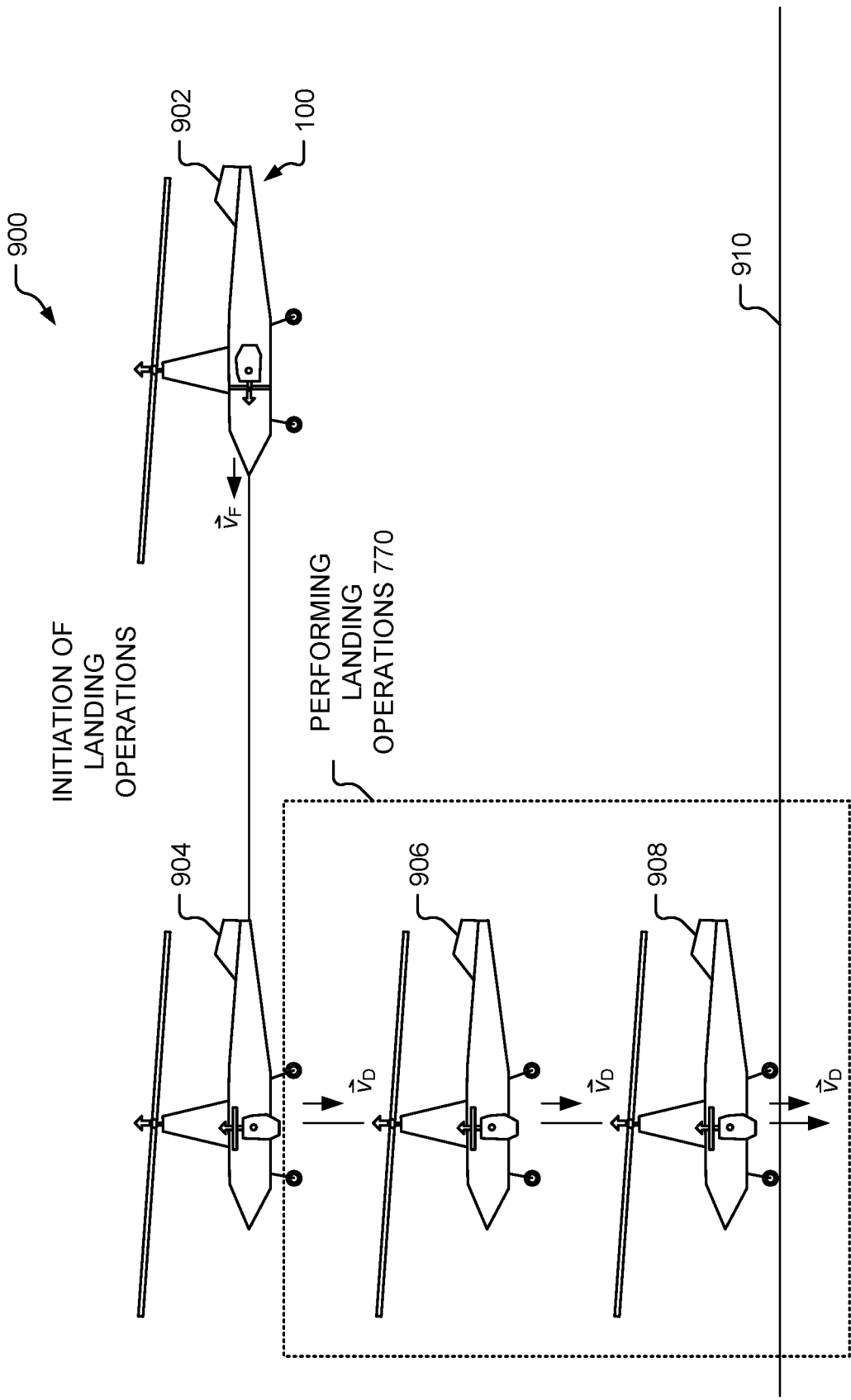
FIG. 9 illustrates an example of a flight profile including landing operations of an autogyro according to the present disclosure.

FIG. 9 illustrates an example of a flight profile 900 including landing operations of the autogyro 100 of FIG. 2A-2D. During a cruise stage 902 (e.g., forward flight) the autogyro 100 may fly at a cruising speed (i.e., a forward flight velocity ($\vec{v}_F$)) and the pilot may make adjustment to the flight control devices 114 via the flight controls 112.

At some point of the flight profile 900, landing operations are initiated 904. After detecting 710 initiation of landing operations, the system for enhanced altitude control 104 rotates 620 the propulsion pods and starts performing landing operations 770. The autogyro 100 then starts to descend and transitions to a descent stage 906 where the forward flight velocity ($\vec{v}_F$) of the autogyro 100 may be minimal.

While performing landing operations 770, measured flight parameters 122 of the autogyro are obtained 514 and thrust parameters are computed 516. For instance, the vertical descent velocity ($\vec{v}_D$) of the autogyro may be repeatedly measured and thrust parameters may be repeatedly computed to keep the vertical descent velocity ($\vec{v}_D$) constant and equal to a target vertical descent velocity (e.g., a reduced velocity of −1 m/s) during landing until the landing is finished 908 and the autogyro 100 reaches ground 910. The target vertical descent velocity may be a descent parameter 742 computed on-board or retrieved from a descent parameters source 740 (e.g., stored on a memory on-board the autogyro or transmitted from external sources).

During landing operations, the thrust parameters of the autogyro are set to the computed values. The thrust parameters may correspond to any of the following parameters (or a combination thereof):

Thrust steering parameters 124 of the thrust steering control devices 230A, 230B. In some implementations, the thrust steering parameters are adjusted multiple times during a descent operation to cause multiple adjustments to the propulsion pods 240A, 240B.

Propulsion parameters 126 of the forward propulsion system 118 (e.g., the angular speed, a pitch angle of the propellers 242A, 242B, or both).

Rotor parameters 128. For instance, the pitch angle of the rotor hub may be adjusted to increase the angle of attack of the plurality of rotor blades 202.

At some point of the landing operations, the autogyro reaches ground 910 and the landing is finished 908. With the system for enhanced altitude control 104 of the present disclosure, vertical landing has been achieved smoothly at a reduced vertical descent velocity.

Figures 10A, 10B:
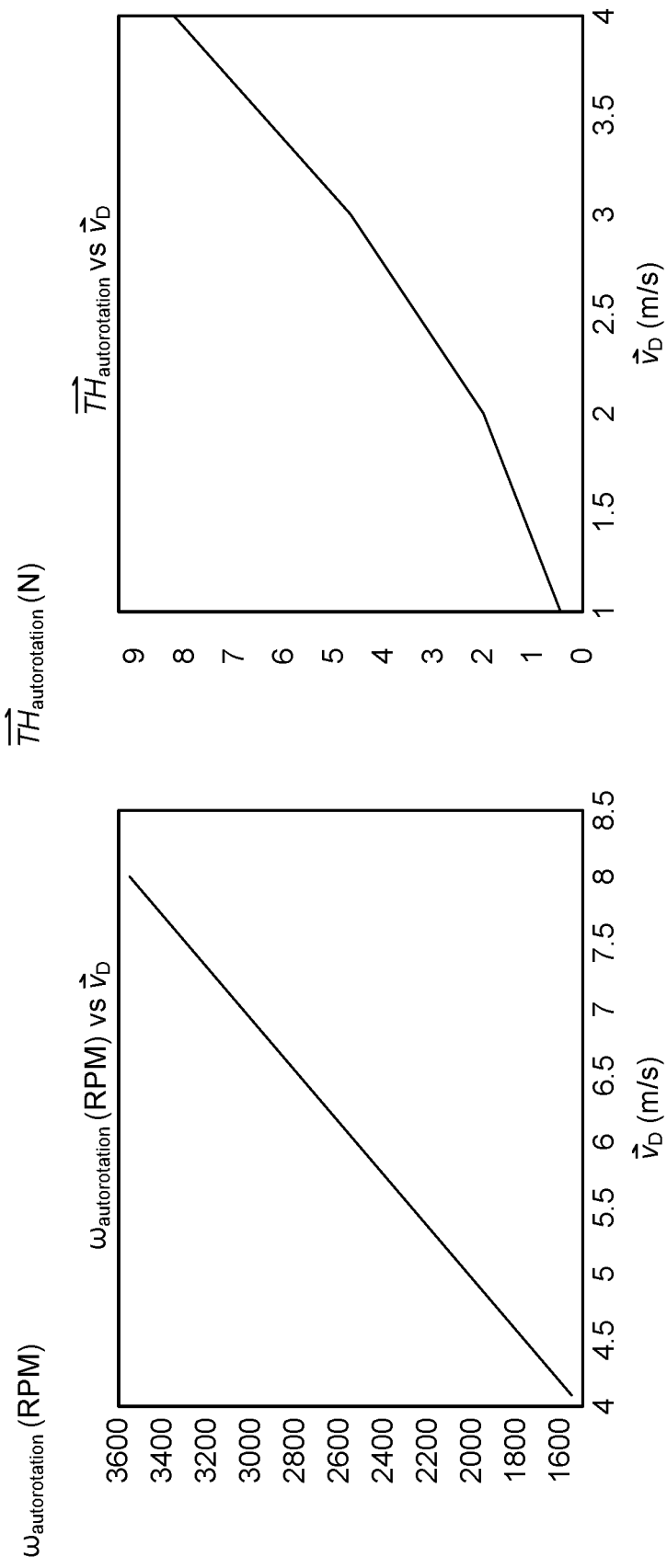

FIGS. 10A-10E present exemplary results produced by numerical models that simulate the autogyro and compute thrust parameters during landing operations. A first numerical model is used to determine thrust generated by the propellers. Lift and drag coefficients can be computed using a software tool for the expected range of local blade angles of attack and local Reynolds numbers. The first numerical model may be used to model propeller performance with axial inflow in the direction of thrust. The first numerical model can be modified and used to model vertical autorotation, as depicted in the graph of FIG. 10A, which shows a relation of angular speed of autorotation ($\omega_{autorotation}$) and vertical descent velocity ($\vec{v}_D$) of the autogyro 100. A second numerical model is used to model autorotation parameters in vertical descent. FIG. 10B shows a graph with a numerical estimation of thrust ($\overline{TH}_{autorotation}$) developed by the rotor in vertical descent.

Figures 10C, 10D:
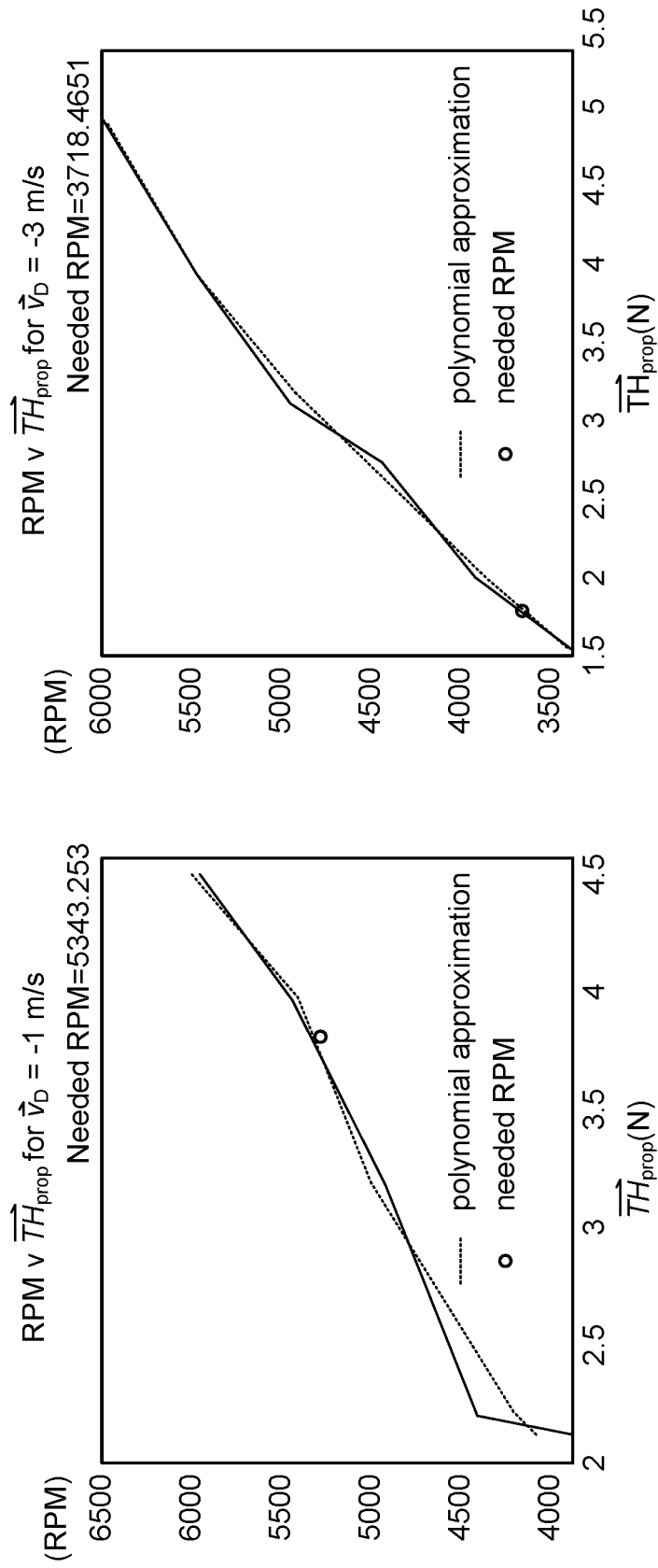

Both the first numerical model and the second numerical model used to generate FIG. 10A and FIG. 10B can be coupled to obtain the parameters of both the main lifting rotor in autorotative state and twin propellers producing thrust in the direction of inflow, which are needed for stable autorotative descent for a number of vertical descent velocities. Exemplary results are shown in FIG. 10C and FIG. 10D, which show propeller angular speed (ω) needed to produce thrust ($\overline{TH}_{prop}$) to sustain autorotative descent at $\vec{v}_D = -1$ m/s (i.e., for FIG. 10C) and at $\vec{v}_D = -3$ m/s (i.e., for FIG. 10D).

Using these numerical models, the control unit 120 of the system for enhanced altitude control 104 can compute, during landing operations, the propeller and rotor parameters for a determined reduced descent velocity. The table of FIG. 10E shows propeller and rotor parameters (i.e., angular speed of the rotor in autorotation, thrust generated by the rotor, thrust generated by the propellers, angular speed of the propellers) for different vertical descent velocities (i.e., $\vec{v}_D = -1$ m/s, $\vec{v}_D = -2$ m/s, $\vec{v}_D = -3$ m/s, and $\vec{v}_D = -4$ m/s).

The weight penalty of the disclosed solution is very low. In some implementations, the weight penalty is estimated at about 3% of the Maximum Take-Off Weight.

Figure 11:
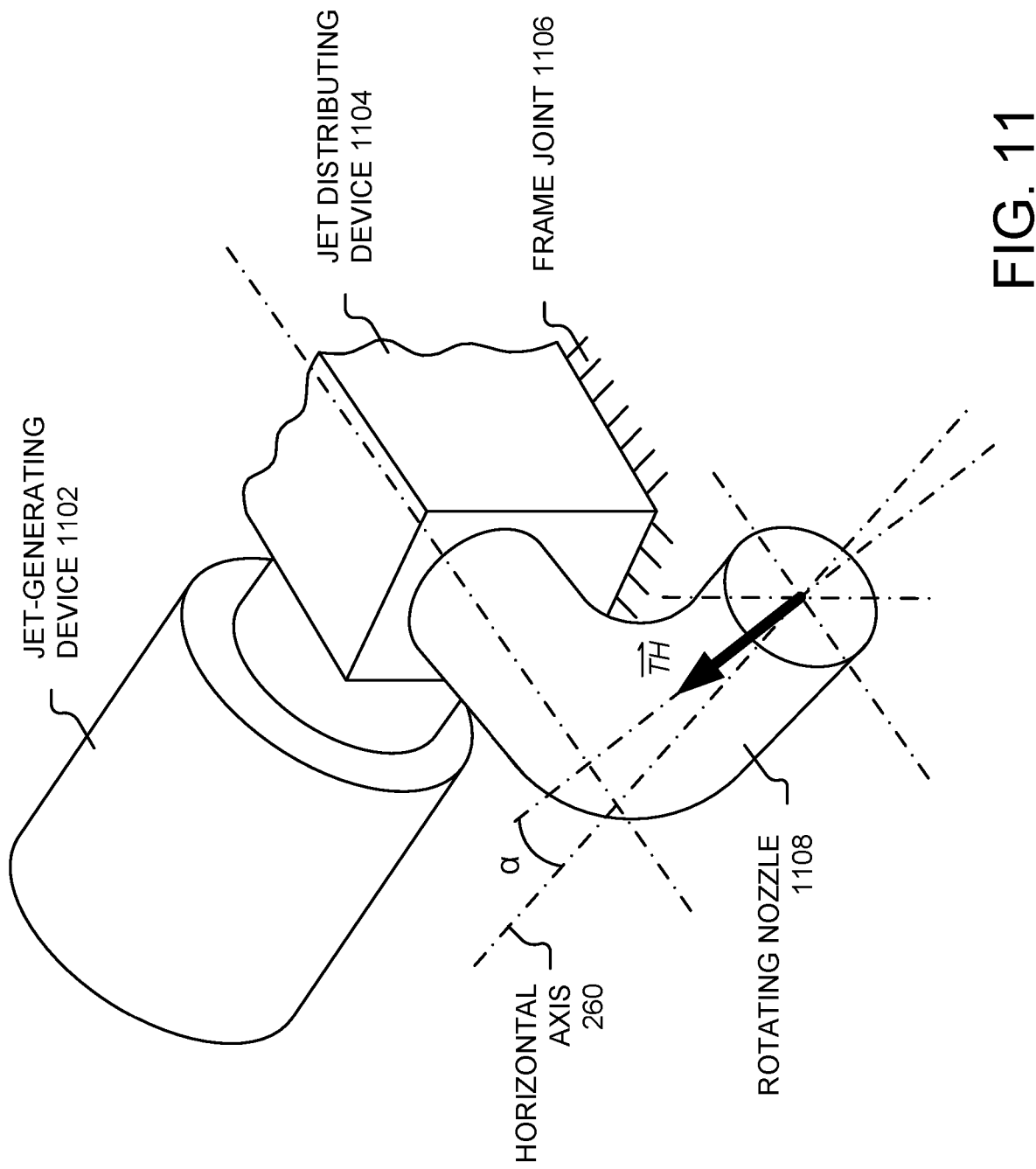
FIG. 11 depicts the system for enhanced altitude control applied to an autogyro powered by a jet-generating device.

FIG. 11 shows the system for enhanced altitude control 104 applied to a forward propulsion system 118 different from the propellers 242A, 242B of FIGS. 2A-2D. In the embodiment of FIG. 11, the system is applied to an autogyro powered by a jet-generating device 1102 (e.g., a jet engine or a ducted fan) having a jet distributing device 1104 attached to the frame 102 of the autogyro through frame joint 1106. A driving unit activates a rotating nozzle 1108. The nozzle 1108 is rotated so that it generates a thrust vector ($\overline{TH}$) tilted an angle (α) with respect to a horizontal axis 260.

Having described various embodiments in detail as required by the patent statutes, those skilled in the art will recognize modifications and substitutions to the specific embodiments disclosed herein. Such modifications are within the scope and intent of the present disclosure as defined in the following claims.

What is claimed is:

1. A system for altitude control of an autogyro during landing, the system comprising:
   a frame;
   on-board sensors coupled to the frame;
   an unpowered rotor coupled to the frame, wherein the unpowered rotor is configured to generate lift during flight;
   a forward propulsion system coupled to the frame for generating a horizontal thrust component of a thrust vector for propelling the autogyro forward during the flight; and
   a landing control system coupled to the forward propulsion system, the landing control system comprising:
      one or more thrust steering control devices configured to steer thrust generated by the forward propulsion system such that the forward propulsion system generates a vertical thrust component of the thrust vector;
      a control unit device coupled to the one or more thrust steering control devices, wherein the control unit device, during a landing phase of the flight, is configured to:
         determine flight parameters based on data from the on-board sensors;
         determine, based on the flight parameters, a target thrust vector, wherein a vertical thrust component of the target thrust vector enables a target vertical descent velocity for the frame; and
         send one or more signals to the one or more thrust steering control devices to cause the forward propulsion system to generate thrust corresponding to the target thrust vector.

2. The system of claim 1, wherein each thrust steering control device of the one or more thrust steering control devices comprises a driving unit coupled to a thrust-generating device of the forward propulsion system, and wherein the driving unit is configured to rotate the thrust-generating device to enable generation of the vertical thrust component.

3. The system of claim 1, wherein the control unit device provides one or more propulsion parameters to the forward propulsion system to enable adjustment of angular speed of propellers of the forward propulsion system.

4. The system of claim 1, wherein the control unit device provides one or more propulsion parameters to the forward propulsion system to enable adjustment of pitch of propellers of the forward propulsion system.

5. The system of claim 1, wherein the control unit device provides one or more rotor parameters to the unpowered rotor to enable adjustment of a pitch angle of a rotor hub of the unpowered rotor.

6. The system of claim 1, wherein the target vertical descent velocity is 1 meter per second.

7. The system of claim 1, further comprising flight control devices coupled to the frame to enable adjustment of an attitude during the flight.

8. The system of claim 7, further comprising flight controls coupled to the frame to enable pilot adjustment of the flight control devices.

9. The system of claim 8, wherein the flight controls comprise a swash plate.

10. The system of claim 7, wherein the flight control devices comprise elevators, flaps, ailerons, a rudder, or combinations thereof.

11. The system of claim 1, wherein:
   the forward propulsion system comprises one or more propulsion pods, each propulsion pod comprising a propeller facing forward for propelling the autogyro forward during flight;
   each thrust steering control device comprises a transmission shaft coupled to at least one propulsion pod; and
   the one or more thrust steering control devices comprises at least one motor for rotating the transmission shaft of each thrust steering control device such that the propeller of the respective propulsion pod faces at least partially upward for generating the vertical thrust component.

12. The system of claim 11, wherein the forward propulsion system comprises a pair of propulsion pods, one propulsion pod coupled to either side of the frame through respective transmission shafts.

13. A method of altitude control during landing of an autogyro having an unpowered rotor for generating lift and a forward propulsion system for generating a horizontal thrust component of a thrust vector for propelling the autogyro forward during flight, the method comprising:
   receiving, at a control unit during the landing of the autogyro, data from on-board sensors, wherein the landing of the autogyro is a portion of a flight of the autogyro;
   determining, at the control unit, flight parameters based on the data;
   determining, at the control unit based on the flight parameters, a target thrust vector, wherein a vertical thrust component of the target thrust vector enables a target vertical descent velocity for the autogyro; and sending one or more signals from the control unit to one or more thrust steering control devices, wherein the one or more signals cause the forward propulsion system to generate thrust corresponding to the target thrust vector.

14. The method of claim 13, wherein the forward propulsion system comprises one or more propulsion pods, each propulsion pod comprising a forward-facing propeller for propelling the autogyro forward during flight.

15. The method of claim 13, wherein the vertical thrust component reduces a vertical descent velocity of the autogyro during the landing of the autogyro.

16. The method of claim 13, further comprising adjusting one or more flight control devices during the flight based on pilot input via one or more flight controls.

17. The method of claim 13, wherein the data from the on-board sensors corresponds to one or more measured flight parameters.

18. The method of claim 17, wherein the one or more measured flight parameters include a vertical descent velocity of the autogyro; an angular speed of the unpowered rotor of the autogyro; fuselage pitch, roll angles, or both, of the autogyro during a flight operation; or a combination thereof.

19. The method of claim 17, further comprising computing, at the control unit, one or more computed thrust parameters using the one or more measured flight parameters.

20. The method of claim 19, wherein the one or more computed thrust parameters include parameters that contribute to a direction, a magnitude, or both of the thrust vector generated by the forward propulsion system, by a thrust vector generated by the unpowered rotor of the autogyro, or both.

* * * * *